US012617531B2

(12) United States Patent
Boudreau et al.

(10) Patent No.: US 12,617,531 B2
(45) Date of Patent: May 5, 2026

(54) PILOT STORAGE SYSTEMS FOR AIRCRAFT CABINS

(71) Applicant: Textron Innovations Inc., Providence, RI (US)

(72) Inventors: Cameron Boudreau, Farmers Branch, TX (US); Andrew James Zahasky, North Richland Hills, TX (US); Chirag Patel, Flower Mound, TX (US); Craig D. Cillessen, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 81 days.

(21) Appl. No.: 18/895,060

(22) Filed: Sep. 24, 2024

(65) Prior Publication Data

US 2026/0084820 A1    Mar. 26, 2026

(51) Int. Cl.
B64D 11/00 (2006.01)
B64D 11/06 (2006.01)

(52) U.S. Cl.
CPC ............ B64D 11/003 (2013.01); B64D 11/06 (2013.01)

(58) Field of Classification Search
CPC ............ B64D 11/0689; B64D 11/0629; B64D 11/003; B64D 11/06; B64D 11/04; B64D 11/0046; B64D 11/0627; A47B 53/02; A47B 87/007; A47B 87/00; A47B 87/008; A47B 87/02; A47B 2200/04
See application file for complete search history.

(56) References Cited

U.S. PATENT DOCUMENTS

| | | | | |
|---|---|---|---|---|
| 7,984,815 B2 * | 7/2011 | Lynch | .................. | A47F 5/0018 211/186 |
| 2008/0042533 A1 * | 2/2008 | Wang | .................... | A47B 43/02 312/259 |
| 2010/0176697 A1 * | 7/2010 | Fuerstenau | ......... | A47B 87/008 312/198 |
| 2023/0110736 A1 * | 4/2023 | Mohr | .................. | B64D 11/003 244/118.5 |
| 2024/0002034 A1 * | 1/2024 | Moore | ...................... | B64C 9/28 |
| 2025/0269972 A1 * | 8/2025 | Peck | ...................... | B64C 29/00 |

FOREIGN PATENT DOCUMENTS

| | | | | | |
|---|---|---|---|---|---|
| GB | | 112757 A | * | 1/1918 | ............ A47B 87/00 |
| KR | | 200314986 Y1 | * | 6/2003 | ............ A47B 87/00 |
| WO | WO-2024256879 A1 | | * | 12/2024 | ............ A47B 87/00 |

\* cited by examiner

*Primary Examiner* — Arfan Y. Sinaki
(74) *Attorney, Agent, or Firm* — Lawrence Youst PLLC

(57) ABSTRACT

A pilot storage system positionable between forward-facing cockpit seats and aft-facing passenger seats in an aircraft cabin. The pilot storage system includes a central cabinet having first and second open sides and an interior storage compartment. A first side cabinet has a first upper storage compartment, a first lower inboard storage compartment with an open side and a first lower outboard storage compartment. A second side cabinet has a second upper storage compartment, a second lower inboard storage compartment with an open side and a second lower outboard storage compartment. The open sides of the first and second lower inboard storage compartments are respectively aligned with the first and second open sides of the central cabinet such that the first and second lower inboard storage compartments and the interior storage compartment form a unified storage compartment that is accessible from the central cabinet.

19 Claims, 11 Drawing Sheets

PILOT STORAGE SYSTEMS FOR AIRCRAFT CABINS

TECHNICAL FIELD OF THE DISCLOSURE

The present disclosure relates, in general, to storage systems for use in aircraft cabins and, in particular, to pilot storage systems that are positionable between forward-facing cockpit seats and aft-facing passenger seats in an aircraft cabin and that include a plurality of purposefully-sized storage areas for the most common types of items transported by pilots.

BACKGROUND

Navigating urban roadways can be a time consuming and frustrating experience due to vehicular traffic, which is rapidly worsening. Air travel provides an alternative transportation option that avoids such ground-level congestion. Rotorcraft, such as helicopters, are particularly well-suited for urban transportation as takeoffs and landings are runway independent. Helicopters can enable travel almost anywhere within a metropolitan area in a matter of minutes, thereby enhancing efficiency and productivity. For example, the reduced travel times provided by helicopters may enable passengers to attend multiple meetings or visits multiple sites in a single day. In addition, helicopters can access remote or hard-to-reach locations and transport passengers directly to their destination, minimizing the need for additional ground transportation. Further, helicopters can provide a private space for conducting business, ensuring that confidential conversations remain secure and uninterrupted. By alleviating the anxiety and frustration associated with navigating congested city streets, helicopters can provide a more relaxed and enjoyable commute. As an added benefit, modern helicopters are equipped with systems that reduce noise pollution and fuel consumption, resulting in a lower environmental impact compared to other modes of transportation. It has been found, however, that helicopter cabins typically lack suitable storage spaces for many of the items that pilots carry on and/or use during flight, such as mobile phones, tablets, laptop computers, jackets, flight bags, logbooks, flight manuals, communications equipment, fire extinguishers, food and beverages. Accordingly, a need has arisen for improved helicopter cabins that provide purposefully-sized storage areas for the most common types of items transported by pilots.

SUMMARY

In a first aspect, the present disclosure is directed to a pilot storage system that is positionable between forward-facing cockpit seats and aft-facing passenger seats in an aircraft cabin. The pilot storage system includes a central cabinet having first and second open sides and an interior storage compartment. A first side cabinet is positioned adjacent to the first open side of the central cabinet. The first side cabinet has a first upper storage compartment, a first lower inboard storage compartment with an open side and a first lower outboard storage compartment separated from the first lower inboard storage compartment by a first divider. A second side cabinet is positioned adjacent to the second open side of the central cabinet. The second side cabinet has a second upper storage compartment, a second lower inboard storage compartment with an open side and a second lower outboard storage compartment separated from the second lower inboard storage compartment by a second divider. The open sides of the first and second lower inboard storage compartments are respectively aligned with the first and second open sides of the central cabinet such that the first and second lower inboard storage compartments and the interior storage compartment form a unified storage compartment that is accessible from the central cabinet.

In certain embodiments, the central cabinet may have a hingable lid with open and closed positions to selectively provide access to the unified storage compartment from the top of the central cabinet. In some embodiments, the hingable lid may include an upper surface having at least a portion that is nonslip. In certain embodiments, the central cabinet may have a forward wall, a lower base, an aft wall and an upper frame that are coupled together to form a trapezoidal prism having the first and second open sides. In such embodiments, the upper frame may have a depth that is less than a depth of the lower base such that the forward wall has an aftward tilt and the aft wall has a forward tilt.

In some embodiments, the first side cabinet may have a forward wall, a lower base, an aft wall, an intermediate panel and a top panel that are coupled together such that the forward wall, the lower base, the aft wall and the intermediate panel form a lower trapezoidal prism including the first lower inboard storage compartment with the open side and the first lower outboard storage compartment and such that the forward wall, the intermediate panel, the aft wall and the top panel form an upper trapezoidal prism including the first upper storage compartment. In certain embodiments, the top panel may have a depth that is less than a depth of the intermediate panel and the depth of the intermediate panel may be less than a depth of the lower base such that the forward wall has an aftward tilt and the aft wall has a forward tilt. In some embodiments, a first drawer may be slidably coupled to the first upper storage compartment with the first drawer having open and closed positions to selectively provide access to the first upper storage compartment. In certain embodiments, a first telescoping slide mechanism may slidably couple the first drawer to the first upper storage compartment. In some embodiments, the first drawer may translate in the inboard direction from the closed position to the open position such that in the open position, the first drawer is positioned at least partially above the central cabinet. In certain embodiments, the first lower inboard storage compartment may be larger than the first lower outboard storage compartment. In some embodiments, the first lower outboard storage compartment may be accessed from an outboard side thereof.

In certain embodiments, the second side cabinet may have a forward wall, a lower base, an aft wall, an intermediate panel and a top panel that are coupled together such that the forward wall, the lower base, the aft wall and the intermediate panel form a lower trapezoidal prism including the second lower inboard storage compartment with the open side and the second lower outboard storage compartment and such that the forward wall, the intermediate panel, the aft wall and the top panel form an upper trapezoidal prism including the second upper storage compartment. In some embodiments, the top panel may have a depth that is less than a depth of the intermediate panel and the depth of the intermediate panel may be less than a depth of the lower base such that the forward wall has an aftward tilt and the aft wall has a forward tilt. In certain embodiments, a second drawer may be slidably coupled to the second upper storage compartment with the second drawer having open and closed positions to selectively provide access to the second upper storage compartment. In some embodiments, a second telescoping slide mechanism may slidably couple the second drawer to the second upper storage compartment. In certain embodiments, the second drawer may translate in the inboard direction from the closed position to the open position such that in the open position, the second drawer is positioned at least partially above the central cabinet. In some embodiments, the second lower inboard storage compartment may be larger than the second outboard storage compartment. In certain embodiments, the second outboard storage compartment may be accessed from an outboard side thereof.

In a second aspect, the present disclosure is directed to an aircraft cabin that includes a row of forward-facing cockpit seats, a row of aft-facing passenger seats and a pilot storage system that is positioned between the row of forward-facing cockpit seats and the row of aft-facing passenger seats. The pilot storage system includes a central cabinet having first and second open sides and an interior storage compartment. A first side cabinet is positioned adjacent to the first open side of the central cabinet. The first side cabinet has a first upper storage compartment, a first lower inboard storage compartment with an open side and a first lower outboard storage compartment separated from the first lower inboard storage compartment by a first divider. A second side cabinet is positioned adjacent to the second open side of the central cabinet. The second side cabinet has a second upper storage compartment, a second lower inboard storage compartment with an open side and a second lower outboard storage compartment separated from the second lower inboard storage compartment by a second divider. The open sides of the first and second lower inboard storage compartments are respectively aligned with the first and second open sides of the central cabinet such that the first and second lower inboard storage compartments and the interior storage compartment form a unified storage compartment that is accessible from the central cabinet.

In a third aspect, the present disclosure is directed to an aircraft that includes a fuselage, an aircraft cabin positioned within the fuselage, a row of forward-facing cockpit seats positioned in the aircraft cabin, a row of aft-facing passenger seats positioned in the aircraft cabin and a pilot storage system positioned between the row of forward-facing cockpit seats and the row of aft-facing passenger seats. The pilot storage system includes a central cabinet having first and second open sides and an interior storage compartment. A first side cabinet is positioned adjacent to the first open side of the central cabinet. The first side cabinet has a first upper storage compartment, a first lower inboard storage compartment with an open side and a first lower outboard storage compartment separated from the first lower inboard storage compartment by a first divider. A second side cabinet is positioned adjacent to the second open side of the central cabinet. The second side cabinet has a second upper storage compartment, a second lower inboard storage compartment with an open side and a second lower outboard storage compartment separated from the second lower inboard storage compartment by a second divider. The open sides of the first and second lower inboard storage compartments are respectively aligned with the first and second open sides of the central cabinet such that the first and second lower inboard storage compartments and the interior storage compartment form a unified storage compartment that is accessible from the central cabinet.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
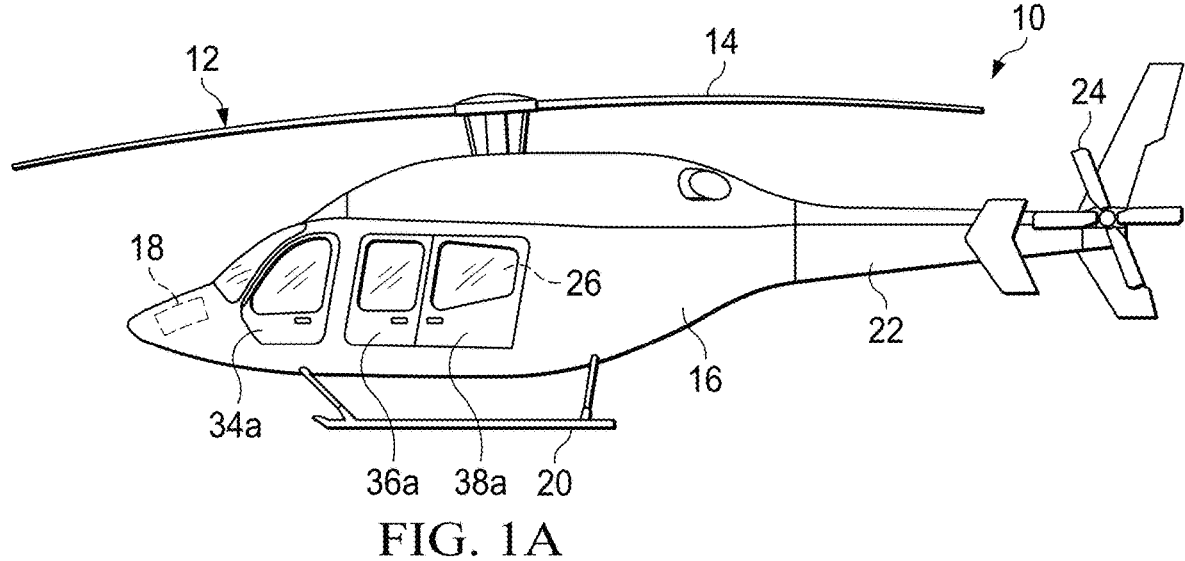
FIGS. 1A-1B are schematic illustrations of a rotorcraft having a pilot storage system in the aircraft cabin in accordance with embodiments of the present disclosure.
Figure 1B:
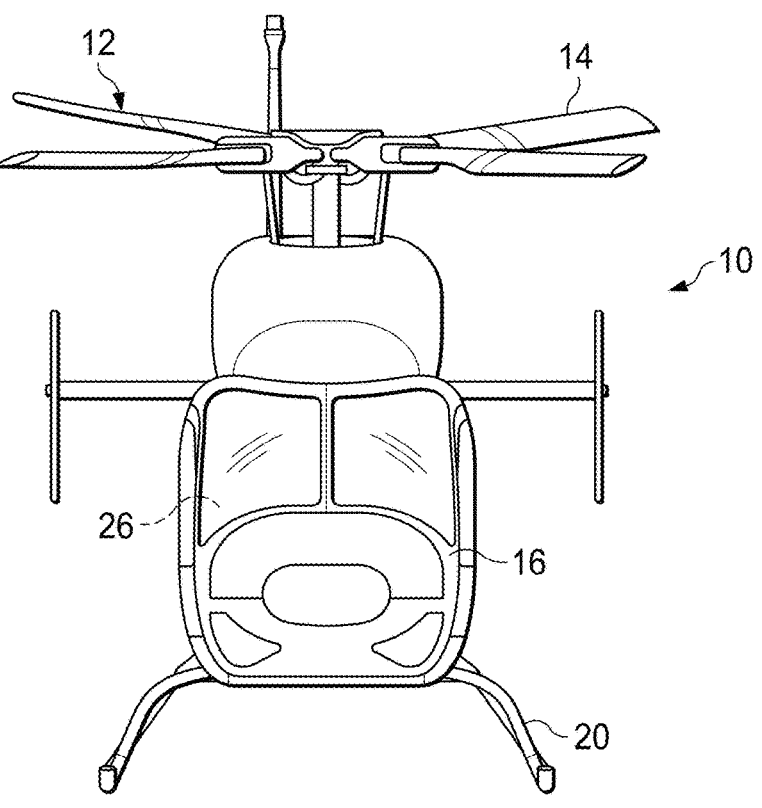

Referring to FIGS. 1A-1B in the drawings, an aircraft depicted as a rotorcraft and more particularly as a helicopter is schematically illustrated and generally designated 10. Helicopter 10 includes a rotor system 12 having a plurality of rotor blade assemblies 14. Rotor system 12 is rotatable relative to a fuselage 16 of helicopter 10. Various operations of rotorcraft 10 including primary flight operations are controlled and managed by a flight control computer 18. The pitch of rotor blade assemblies 14 can be collectively and/or cyclically manipulated to selectively control direction, thrust and lift of helicopter 10. A landing gear system 20 provides ground support for helicopter 10. A tailboom 22 extends aftwardly from fuselage 16. A tail rotor system 24 is rotatably coupled to the aft portion of tailboom 22. The main interior space of helicopter 10 is an aircraft cabin 26 that includes seating for one or more pilots and a plurality of passengers, such as four, five, six or more passengers. The pilots operate helicopter 10 from the cockpit which forms the forward portion of cabin 26 and includes, for example, one or more collective levers, one or more cyclic sticks and one or more sets of foot pedals as well as various other instruments, displays and controls (see also FIG. 2A).

Aircraft cabin 26 includes a plurality of windows that provide visibility for the occupants of helicopter 10. Aircraft cabin 26 may be equipped with heating and cooling systems to maintain a comfortable temperature therein. In the illustrated embodiment, aircraft cabin 26 includes one or more storage systems that provide safe and secure spaces for personal items, luggage and equipment. For example, a pilot storage system 28 for aircraft cabins (see also FIGS. 2A-2C) may be positioned between a row of forward-facing cockpit seats 30a, 30b and a row of aft-facing passenger seats 32a, 32b, 32c within aircraft cabin 26 and may have purpose-fully-sized storage areas for the most common types of items transported by pilots such as flight bags, jackets, logbooks, manuals, mobile phones, tablets, laptop computers, food and beverages. Pilot storage system 28 may also have purpose-fully-sized storage areas for safety equipment such as fire extinguishers and life vests as well as for communication equipment such as headsets. Each side of helicopter 10 is equipped with a cockpit door 34a, 34b, a forward passenger door 36a, 36b and an aft passenger doors 38a, 38b to enable ingress to and egress from helicopter 10.

It should be appreciated that helicopter 10 is merely illustrative of a variety of aircraft that can implement the embodiments disclosed herein. Indeed, the storage systems of the illustrative embodiments may be implemented on any aircraft. Other aircraft implementations can include fixed wing aircraft, hybrid aircraft, tiltwing aircraft, tiltrotor aircraft, compound helicopters, jets and the like. As such, those skilled in the art will recognize that the storage systems of the illustrative embodiments can be integrated into a variety of aircraft configurations. It should be appreciated that even though aircraft are particularly well-suited to implement the embodiments of the present disclosure, non-aircraft vehicles can also implement the embodiments.

Figure 2A:
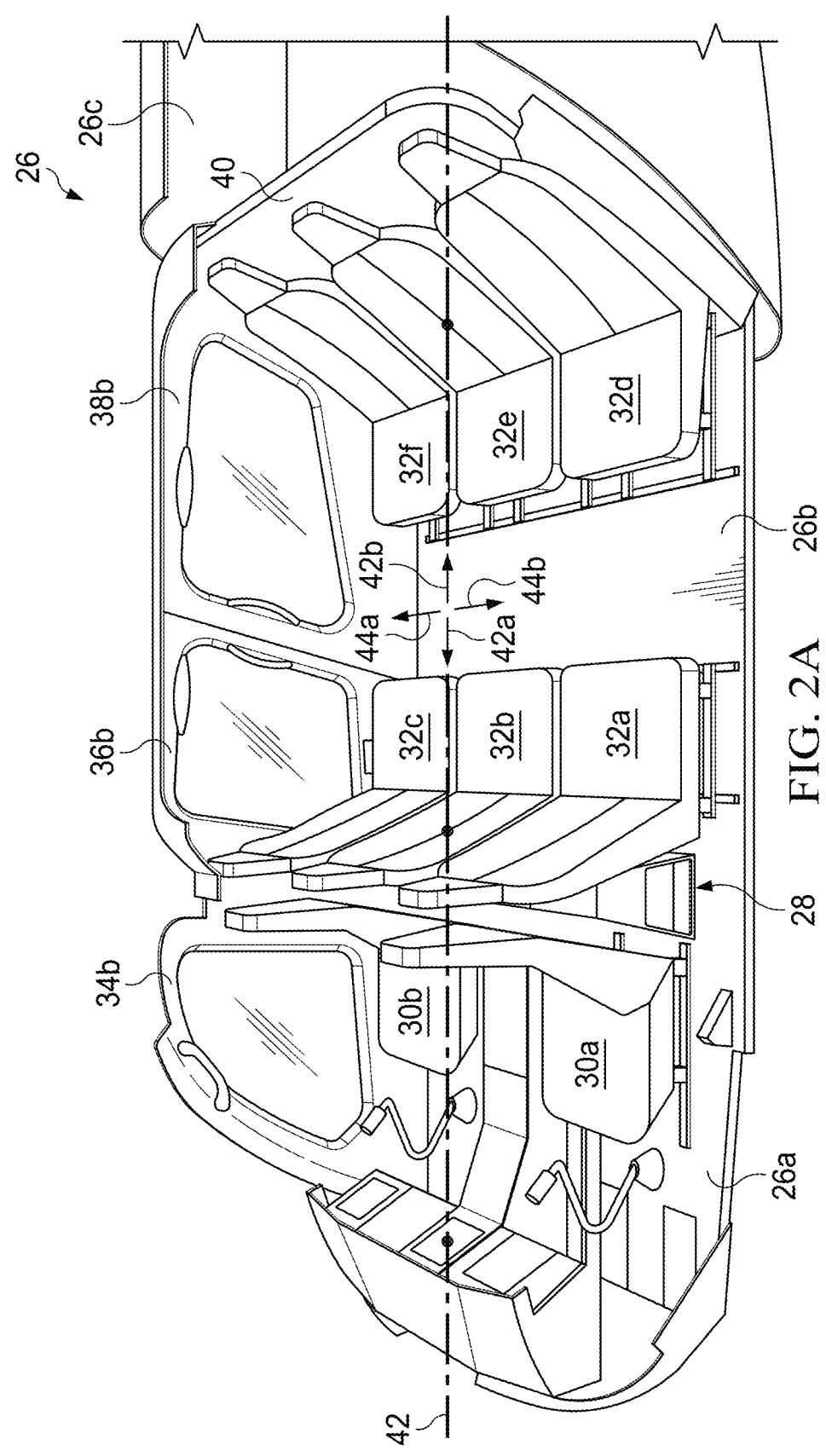
FIGS. 2A-2C are isometric views of an aircraft cabin including a pilot storage system positioned between the forward-facing cockpit seats and the aft-facing passenger seats in accordance with embodiments of the present disclosure.
Figure 2B:
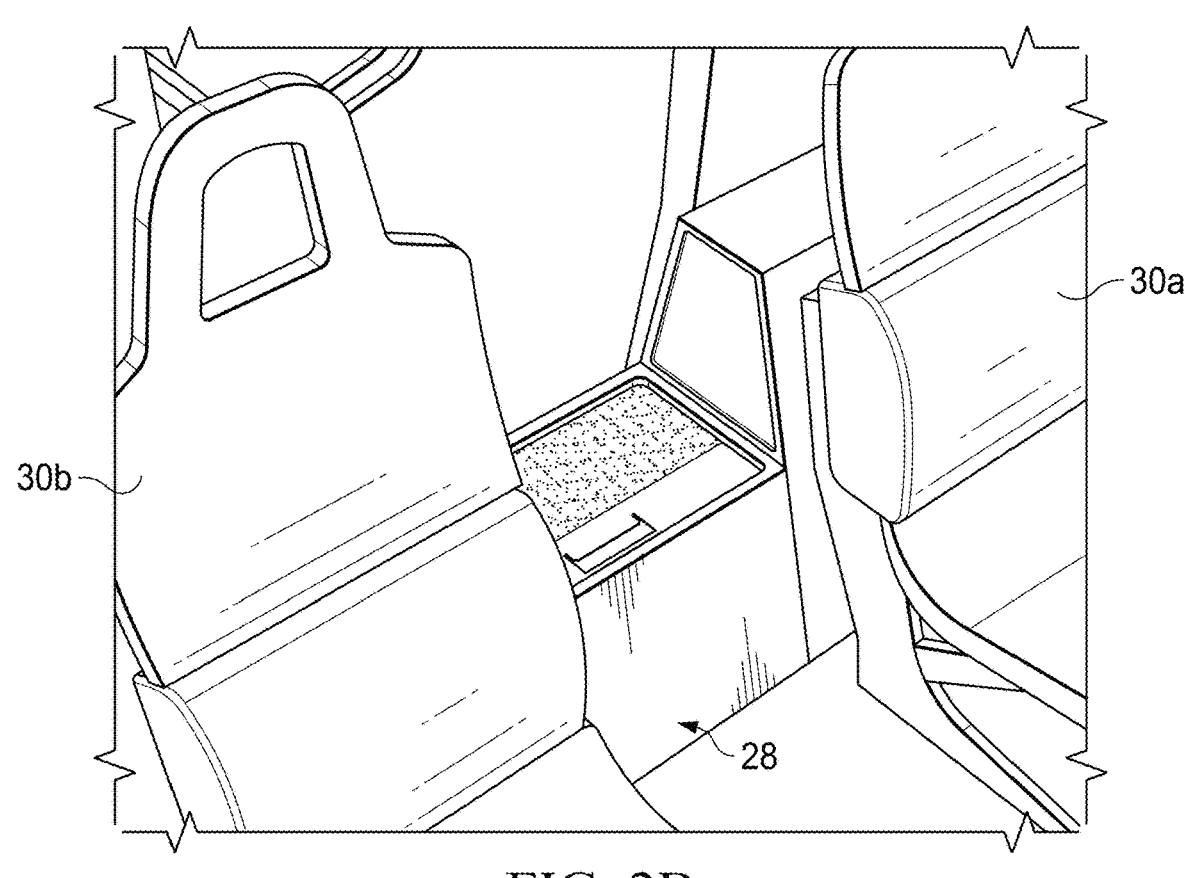
Figure 2C:
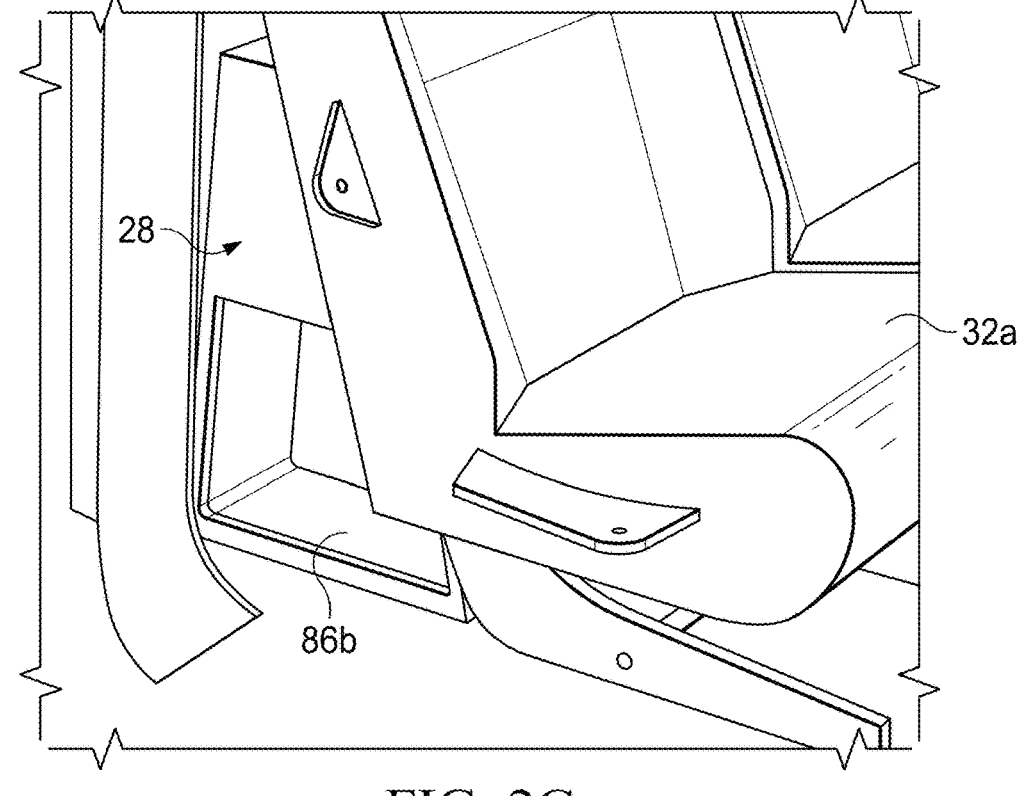

Referring specifically to FIGS. 2A-2C of the drawings, additional detail of aircraft cabin 26 will be discussed. In the illustrated embodiment, aircraft cabin 26 has a cockpit 26a that includes forward-facing cockpit seats 30a, 30b, a passenger compartment 26b that includes aft-facing passenger seats 32a, 32b, 32c and a row of forward-facing passenger seats 32d, 32e, 32f, and a cargo area 26c positioned aft a bulkhead 40. Due in part to the aftward tilt of forward-facing cockpit seats 30a, 30b and the forward tilt of aft-facing passenger seats 32a, 32b, 32c, there is a space between forward-facing cockpit seats 30a, 30b and aft-facing passenger seats 32a, 32b, 32c which becomes progressively wider toward the floor of cabin 26. In a conventional helicopter, this space may go substantially unused or may be used to insecurely accumulate various items. In the illustrated embodiment, however, pilot storage system 28 is positioned in this space between forward-facing cockpit seats 30a, 30b and aft-facing passenger seats 32a, 32b, 32c such that the pilots have purposefully-sized and secure storage areas for the most common types of items transported by pilots. In order to maximize the secure storage area between forward-facing cockpit seats 30a, 30b and aft-facing passenger seats 32a, 32b, 32c, pilot storage system 28 has a unique shape including a plurality of trapezoidal prisms that are stacked and that positioned with side-by-side relationships to form a unified storage compartment, as discussed herein. Importantly, pilot storage system 28 includes multiple secure storage compartments that are accessible from cockpit seats 30a, 30b. For example, as best seen in FIG. 2B, a pilot seated in either of cockpit seats 30a, 30b has access to the unified storage compartment within pilot storage system 28 via a hingable lid on an upper portion of a central cabinet. In addition, from each of cockpit seats 30a, 30b, a pilot will have easy access to at least one upper storage compartment of a side cabinet via a slidable drawer. Also, as best seen in FIG. 2C, a pilot can access a lower outboard storage compartment when helicopter 10 is on the ground through an open forward passenger door 36a, 36b. In certain embodiments, these lower outboard storage compartments may also be accessed by a passenger sitting in one of the outboard aft-facing passenger seats 32a, 32c.

Helicopter 10 has a longitudinal axis 42 that extends through a central vertical plane that bisects aircraft cabin 26. The forward direction of helicopter 10 is indicated by arrow 42a and the backwards direction of helicopter 10 is indicated by arrow 42b. The backward direction may also be referred to herein as the aft direction. The lateral direction of helicopter 10 is normal to the central vertical plane with the rightward direction indicated by arrow 44a and the leftward direction indicated by arrow 44b. It should be understood by those having ordinary skill in the art that the right side and the left side of helicopter 10 will be with reference to a pilot sitting in helicopter 10 with the right side of helicopter 10 corresponding to the right side of the pilot and the left side of helicopter 10 corresponding to the left side of the pilot. The term outboard refers to the relative position of a part or component that is located farther away from the central vertical plane of helicopter 10 and the term inboard refers to the relative position of a part or component that is located closer to the central vertical plane of helicopter 10.

Cockpit seats 30a, 30b and passenger seats 32a, 32b, 32c, 32d, 32e, 32f preferably provide a high level of protection for the occupants of helicopter 10 in the event of an emergency and are designed to withstand the forces of a crash to protect the occupants from injury. For example, the seats may be constructed with energy-absorbing materials that can help reduce the impact of a crash on the occupants. In addition, the seats include harnesses or restraint systems (not shown) that secures the occupants in place to help prevent them from being ejected from the seats and also include headrests that can help prevent whiplash and other neck injuries. The seats may be covered with materials that are chosen for their durability, comfort and safety. For example, the seats may be covered with leather, which is comfortable and easy to clean, lightweight fabrics made from nylon or polyester including flame-resistant fabrics that are designed to slow the spread of fire and protect the passengers from burns and/or neoprene, which is resistant to moisture and provides good cushioning.

Figure 3A:
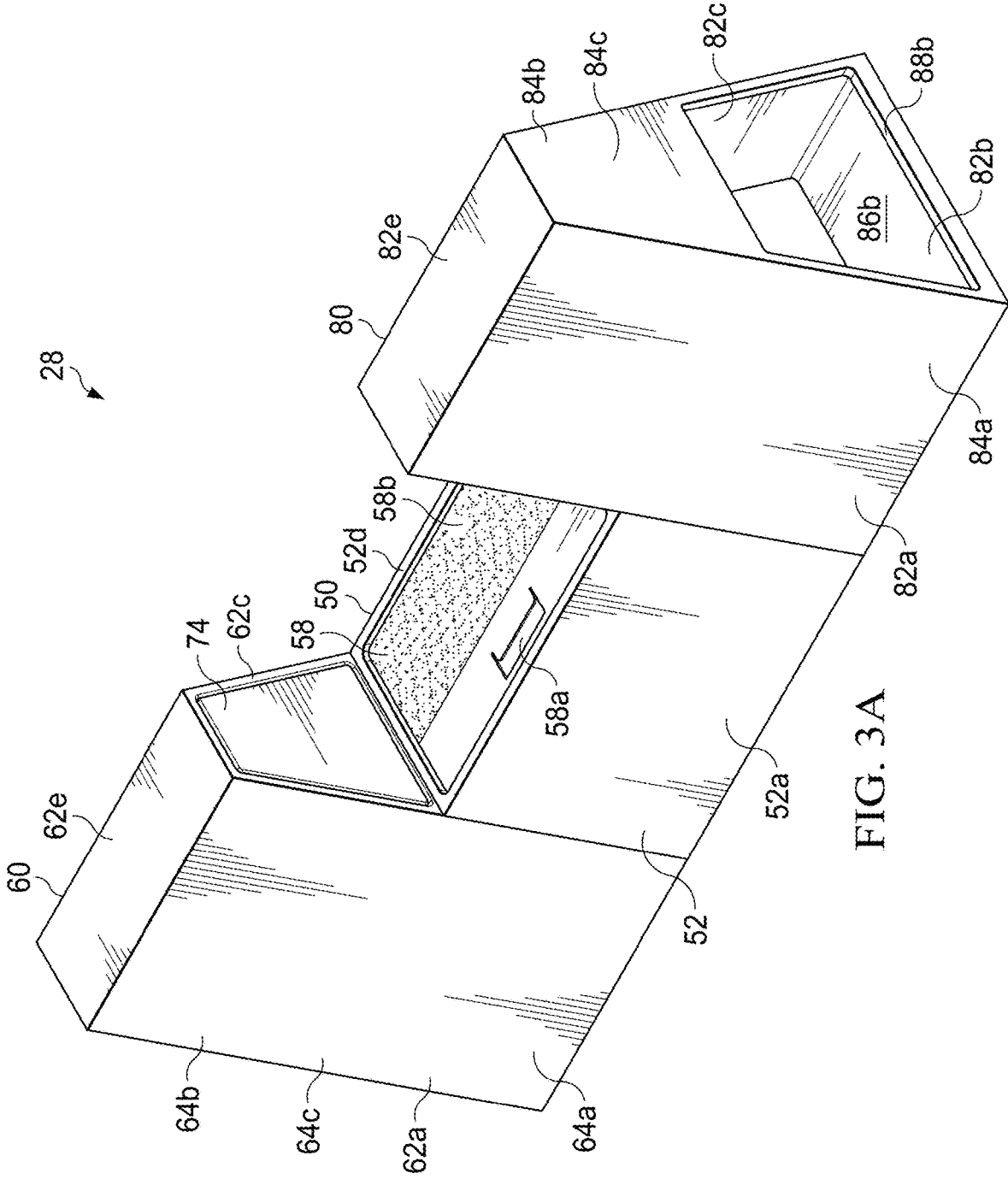
FIGS. 3A-3C are isometric, exploded and cross sectional views of a pilot storage system in accordance with embodiments of the present disclosure.
Figure 3B:
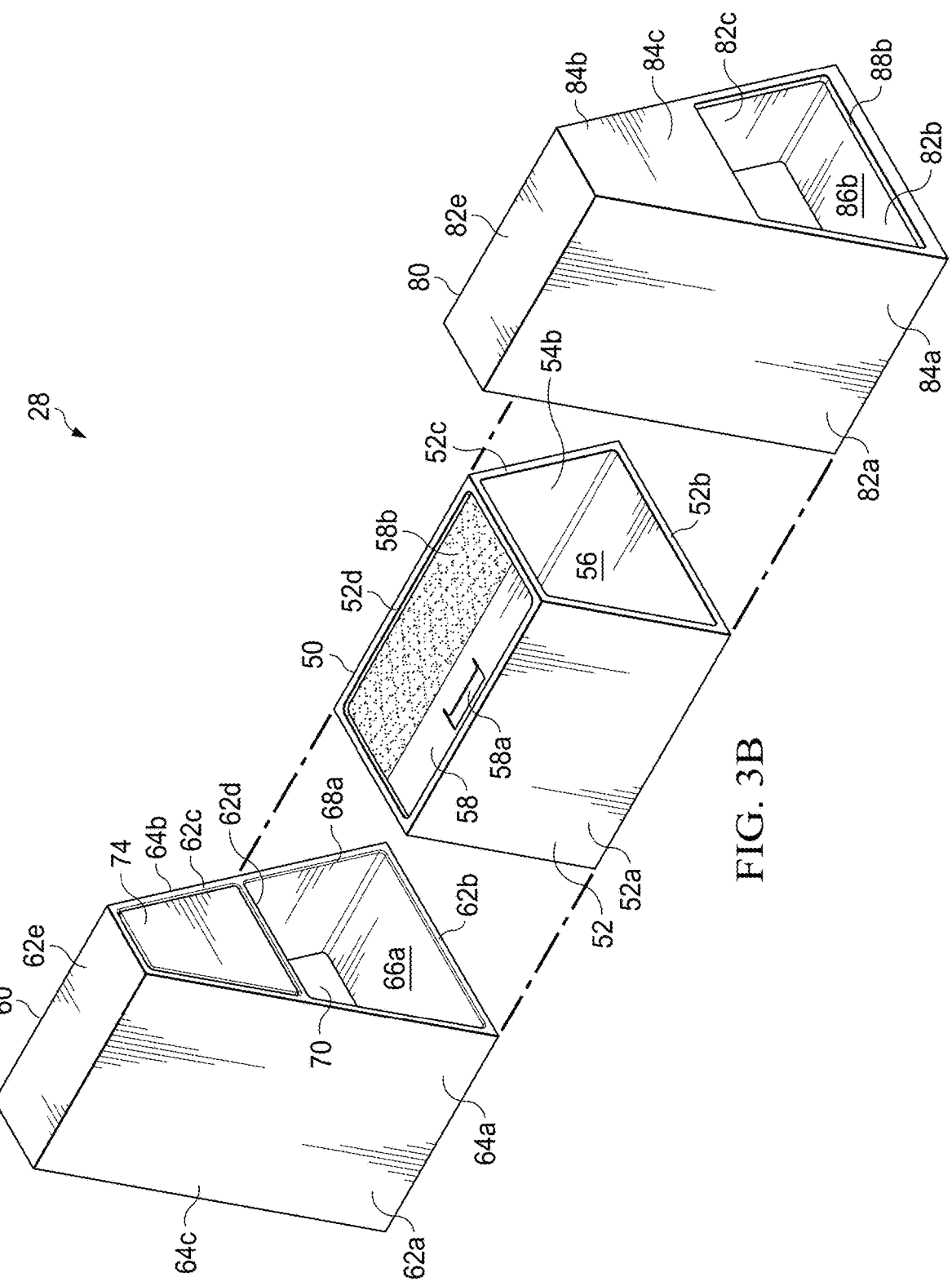
Figure 3C:
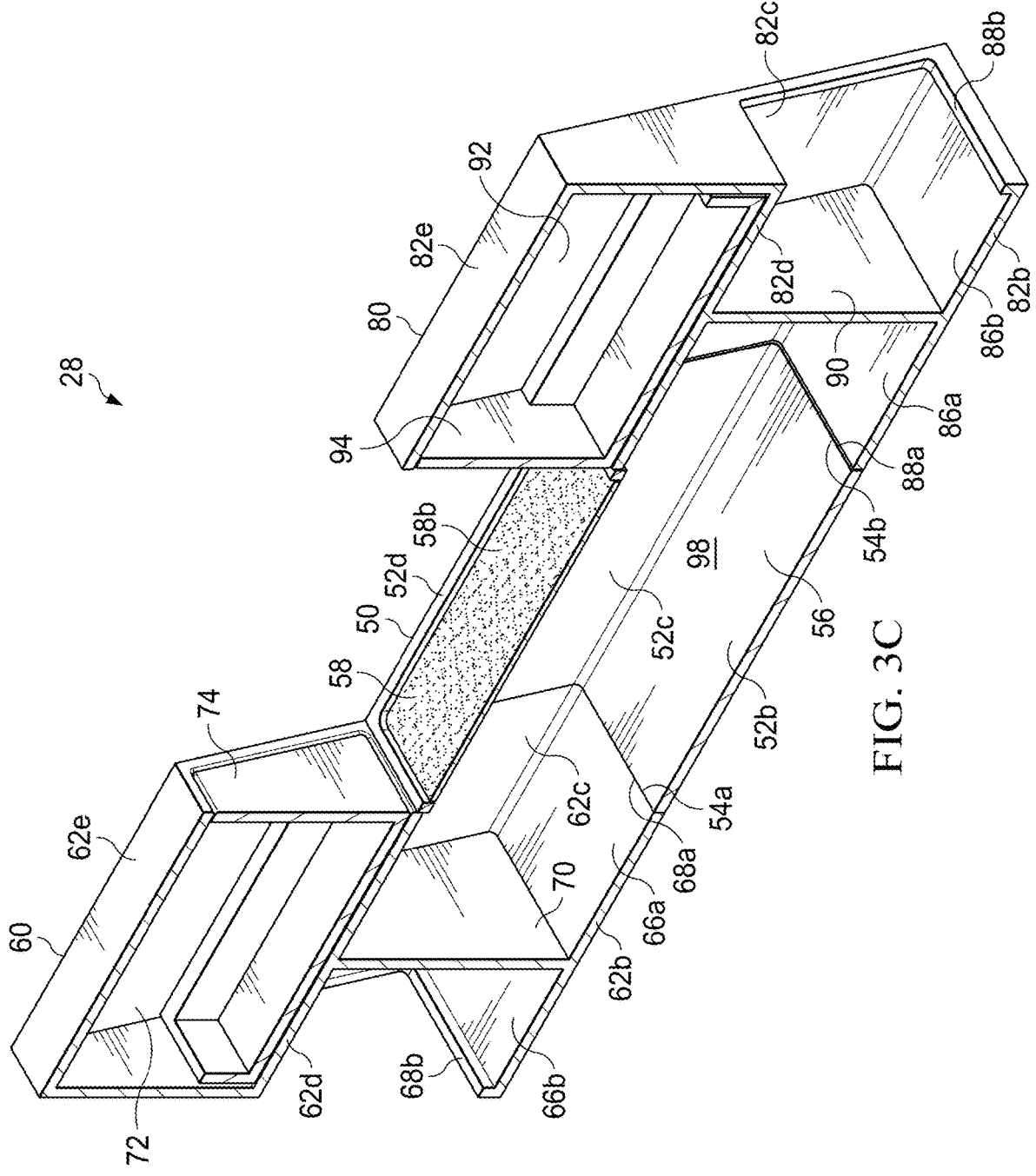
Figure 4A:
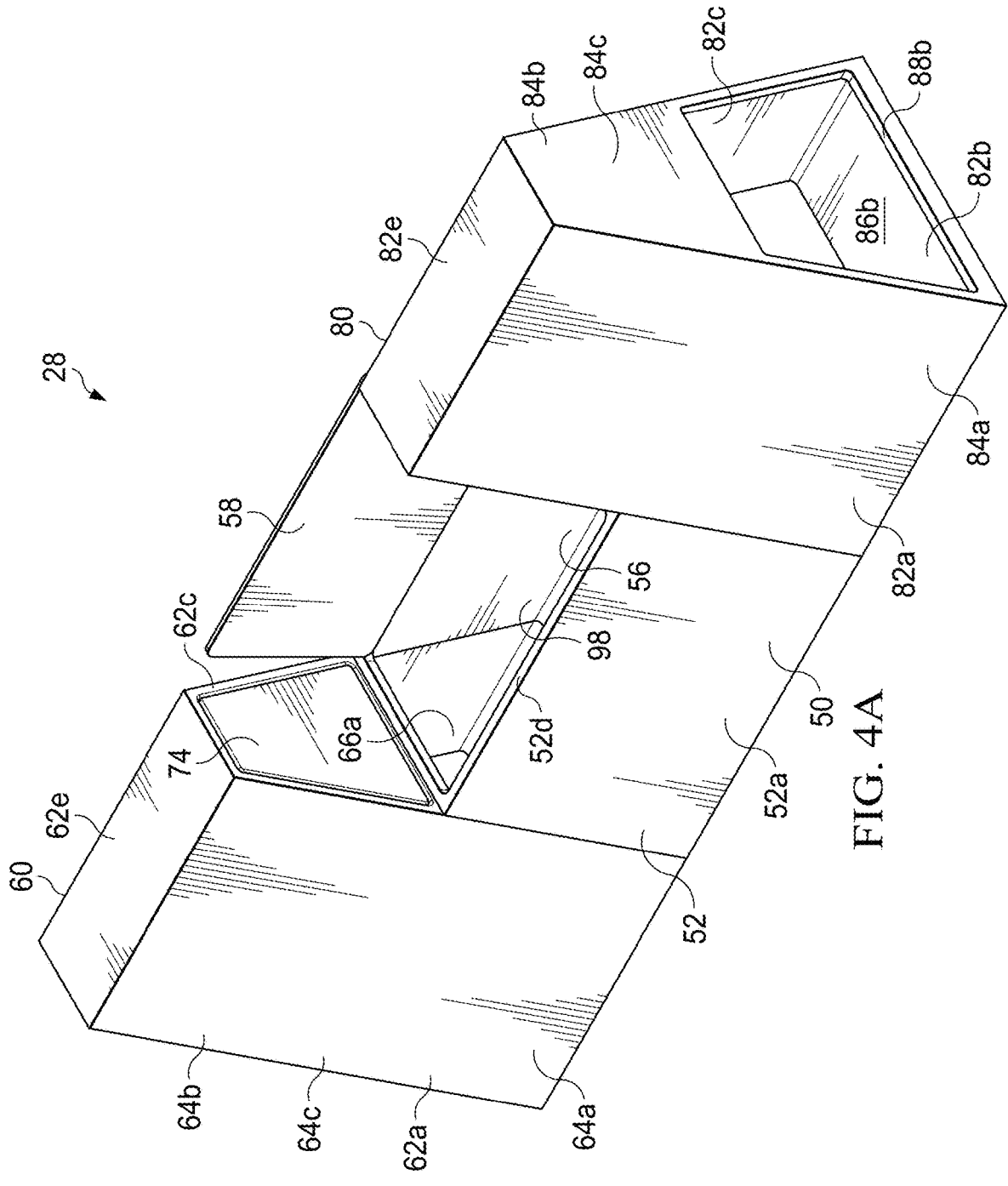
FIGS. 4A-4C are isometric views of a pilot storage system in various operating configurations in accordance with embodiments of the present disclosure.

As illustrated, pilot storage system 28 is positionable in this space between forward-facing cockpit seats 30a, 30b and aft-facing passenger seats 32a, 32b, 32c such that the pilots have easy access to purposefully-sized and secure storage areas for the most common types of items transported by pilots. Referring more specifically to FIGS. 3A-3C of the drawings, addition details relating to pilot storage system 28 will now be discussed. Pilot storage system 28 includes a central cabinet 50 having a forward wall 52*a*, a lower base 52*b*, an aft wall 52*c* and an upper frame 52*d* that are coupled together using screws, glue, hidden joints or other suitable fastening means to form a trapezoidal prism 52 having open sides 54*a*, 54*b* and defining an interior storage compartment 56. Central cabinet 50 has a lid 58 that is hingably coupled to upper frame 52*d*. Lid 58 includes a handle 58*a* that allows a user to open and closed lid 58 (see also FIG. 4A) to selectively provide access to interior storage compartment 56 from the top of central cabinet 50. In the illustrated embodiment, a portion of the upper surface of lid 58 has a nonslip surface 58*b* such that items placed thereon, for example mobile phones, tend to remain in place during flight. Lid 58 may have a soft close mechanism for operating lid 58 between the open and closed positions. When closed, lid 58 is secured to upper frame 52*d* such that lid 58 does not open inadvertently. The depth of upper frame 52*d* defined as the distance between forward wall 52*a* and aft wall 52*c* at upper frame 52*d* is less than the depth of lower base 52*b* defined by the distance between forward wall 52*a* and aft wall 52*c* at lower base 52*b*. In this configuration, forward wall 52*a* has an aftward tilt which tends to match the aftward tilt of forward-facing cockpit seats 30*a*, 30*b* and aft wall 52*c* has a forward tilt which tends to match the forward tilt of aft-facing passenger seats 32*a*, 32*b*, 32*c*.

A right side cabinet 60 is positioned adjacent to open side 54*a* of central cabinet 50. Right side cabinet 60 has a forward wall 62*a*, a lower base 62*b*, an aft wall 62*c*, an intermediate panel 62*d* and a top panel 62*e* that are coupled together using screws, glue, hidden joints or other suitable fastening means. Together, a lower portion of forward wall 62*a*, lower base 62*b*, a lower portion of aft wall 62*c* and intermediate panel 62*d* form a lower trapezoidal prism 64*a*. Similarly, an upper portion of forward wall 62*a*, intermediate panel 62*d*, an upper portion of aft wall 62*c* and top panel 62*e* form an upper trapezoidal prism 64*b*. In addition, forward wall 62*a*, lower base 62*b*, aft wall 62*c* and top panel 62*e* form a trapezoidal prism 64*c*. The depth of top panel 62*e* defined as the distance between forward wall 62*a* and aft wall 62*c* at top panel 62*e* is less than the depth of intermediate panel 62*d* defined by the distance between forward wall 62*a* and aft wall 62*c* at intermediate panel 62*d* which is less than the depth of lower base 62*b* defined by the distance between forward wall 62*a* and aft wall 62*c* at lower base 62*b*. In this configuration, forward wall 62*a* has an aftward tilt which tends to match the aftward tilt of forward-facing cockpit seats 30*a*, 30*b* and aft wall 62*c* has a forward tilt which tends to match the forward tilt of aft-facing passenger seats 32*a*, 32*b*, 32*c*.

Figure 4B:
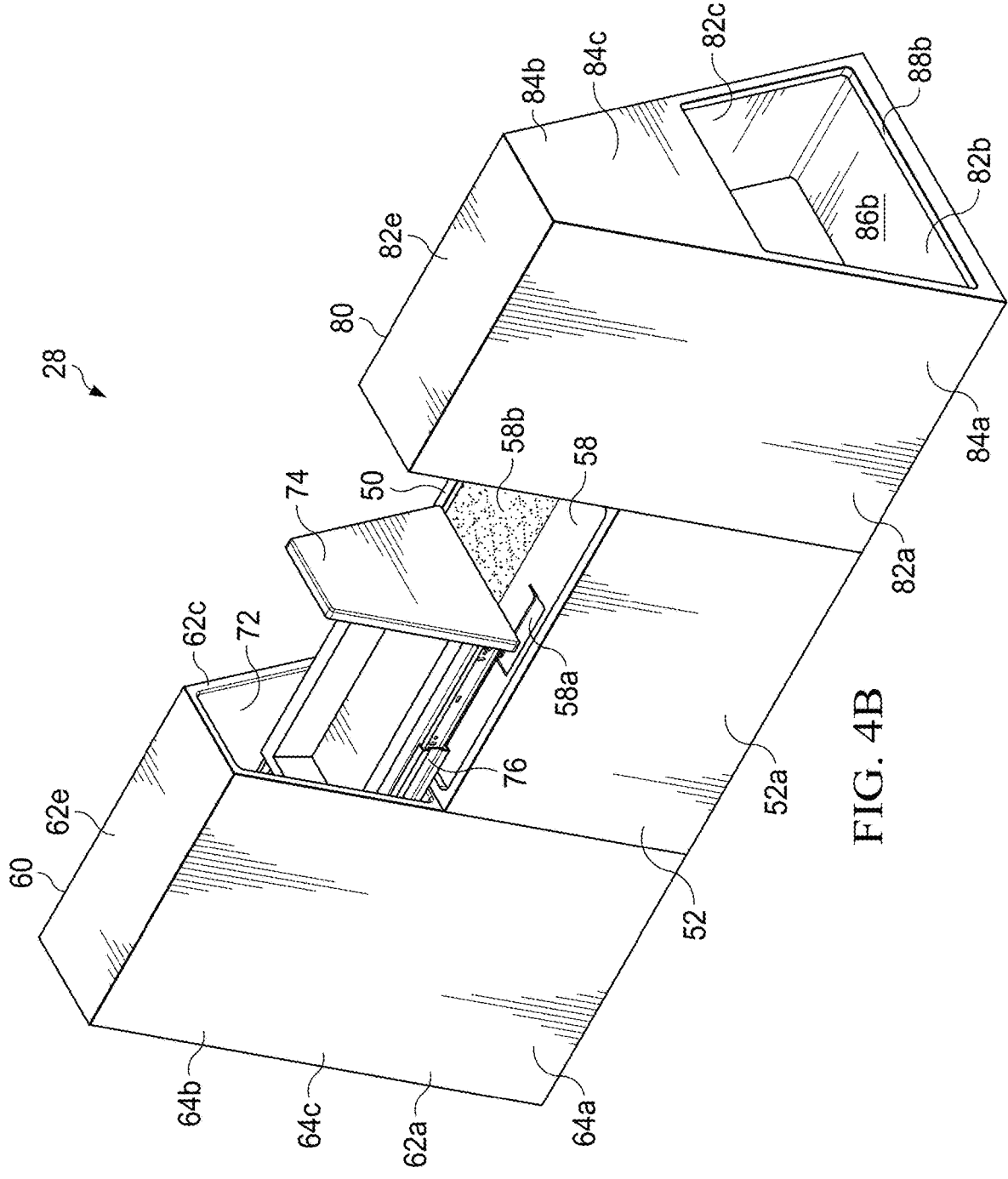

Lower trapezoidal prism 64*a* defines a lower inboard storage compartment 66*a* with an open inboard side 68*a* that may be accessed from the top of central cabinet 50 when lid 58 is open, as discussed herein. In addition, lower trapezoidal prism 64*a* defines a lower outboard storage compartment 66*b* with an open outboard side 68*b* that is accessed from an outboard side thereof via forward passenger door 36*b* when forward passenger door 36*b* is open. In the illustrated embodiment, a divider 70 separates lower inboard storage compartment 66*a* and lower outboard storage compartment 66*b* such that lower inboard storage compartment 66*a* is larger than lower outboard storage compartment 66*b*. In other embodiments, the lower inboard storage compartment may be smaller than the lower outboard storage compartment of a side cabinet. Upper trapezoidal prism 64*b* defines an upper storage compartment 72. In the illustrated embodiment, a drawer 74 is coupled to upper storage compartment 72 with a telescoping slide mechanism 76 such that drawer 74 has open and closed positions to selectively provide access to upper storage compartment 72. As best seen in FIG. 4B, when drawer 74 translates in the inboard direction from the closed position to the open position, drawer 74 is positioned at least partially above central cabinet 50. Drawer 74 may have a soft close mechanism for operating drawer 74 between the open and closed positions. When closed, drawer 74 is secured to upper storage compartment 72 such that drawer 74 does not open inadvertently.

A left side cabinet 80 is positioned adjacent to open side 54*b* of central cabinet 50. Left side cabinet 80 has a forward wall 82*a*, a lower base 82*b*, an aft wall 82*c*, an intermediate panel 82*d* and a top panel 82*e* that are coupled together using screws, glue, hidden joints or other suitable fastening means. Together, a lower portion of forward wall 82*a*, lower base 82*b*, a lower portion of aft wall 82*c* and intermediate panel 82*d* form a lower trapezoidal prism 84*a*. Similarly, an upper portion of forward wall 82*a*, intermediate panel 82*d*, an upper portion of aft wall 82*c* and top panel 82*e* form an upper trapezoidal prism 84*b*. In addition, forward wall 82*a*, lower base 82*b*, aft wall 82*c* and top panel 82*e* form a trapezoidal prism 84*c*. The depth of top panel 82*e* defined as the distance between forward wall 82*a* and aft wall 82*c* at top panel 82*e* is less than the depth of intermediate panel 82*d* defined by the distance between forward wall 82*a* and aft wall 82*c* at intermediate panel 82*d* which is less than the depth of lower base 82*b* defined by the distance between forward wall 82*a* and aft wall 82*c* at lower base 82*b*. In this configuration, forward wall 82*a* has an aftward tilt which tends to match the aftward tilt of forward-facing cockpit seats 30*a*, 30*b* and aft wall 82*c* has a forward tilt which tends to match the forward tilt of aft-facing passenger seats 32*a*, 32*b*, 32*c*.

Figure 4C:
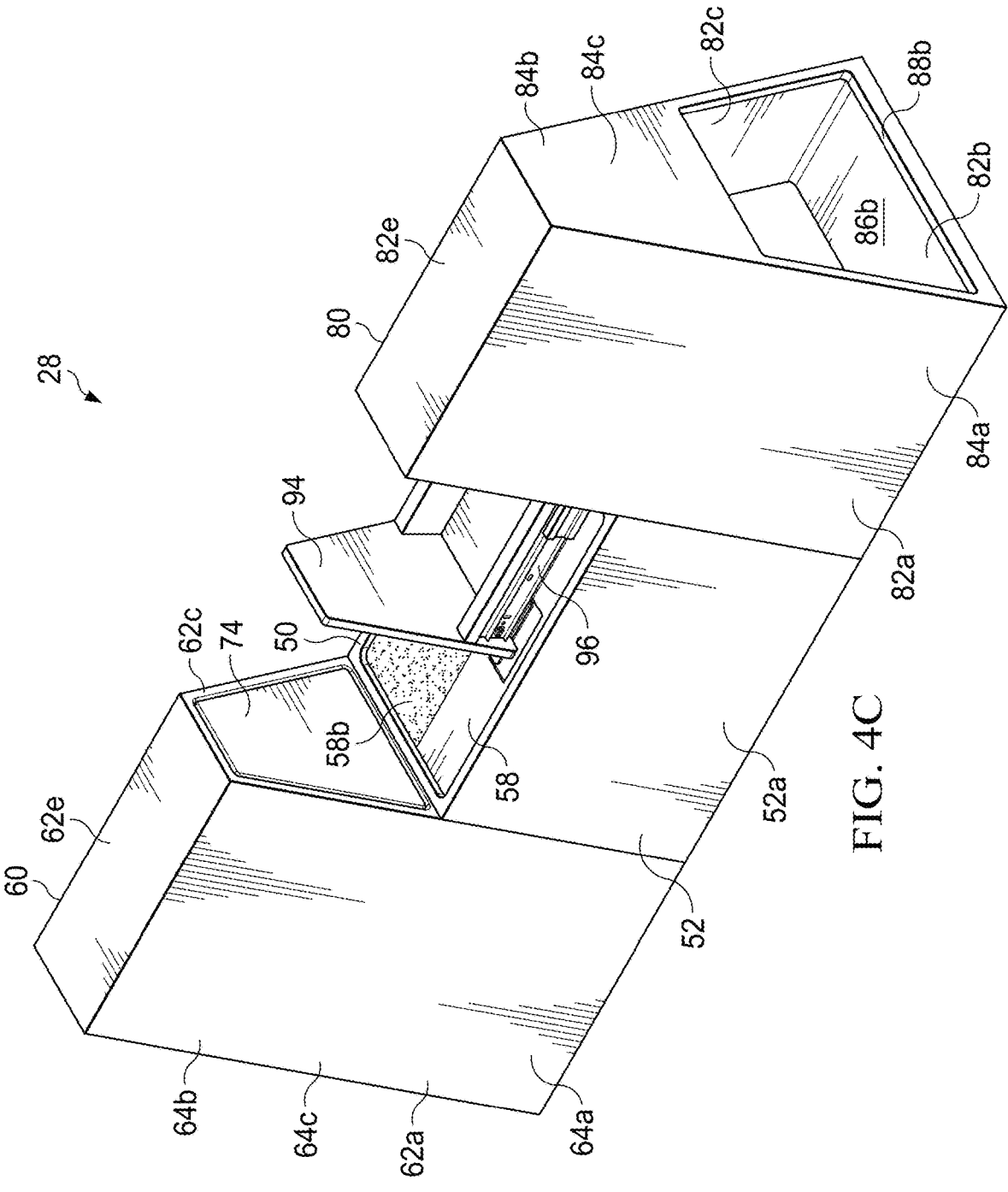

Lower trapezoidal prism 84*a* defines a lower inboard storage compartment 86*a* with an open inboard side 88*a* that may be accessed from the top of central cabinet 50 when lid 58 is open, as discussed herein. In addition, lower trapezoidal prism 84*a* defines a lower outboard storage compartment 86*b* with an open outboard side 88*b* that is accessed from an outboard side thereof via forward passenger door 36*a* when forward passenger door 36*a* is open (see also FIG. 2C). In the illustrated embodiment, a divider 90 separates lower inboard storage compartment 86*a* and lower outboard storage compartment 86*b* such that lower inboard storage compartment 86*a* is larger than lower outboard storage compartment 86*b*. Upper trapezoidal prism 84*b* defines an upper storage compartment 92. In the illustrated embodiment, a drawer 94 is coupled to upper storage compartment 92 with a telescoping slide mechanism 96 such that drawer 94 has open and closed positions to selectively provide access to upper storage compartment 92. As best seen in FIG. 4C, when drawer 94 translates in the inboard direction from the closed position to the open position, drawer 94 is positioned at least partially above central cabinet 50. Drawer 94 may have a soft close mechanism for operating drawer 94 between the open and closed positions. When closed, drawer 94 is secured to upper storage compartment 92 such that drawer 94 does not open inadvertently.

In the fully assembled orientation, pilot storage system 28 includes right side cabinet 60 positioned adjacent to open side 54*a* of central cabinet 50 and left side cabinet 80 positioned adjacent to open side 54*b* of central cabinet 50 such that open side 68*a* of lower inboard storage compartments 66a is aligned with open side 54a of central cabinet 50 and such that open side 88a of lower inboard storage compartments 86a is aligned with open side 54b of central cabinet 50. In this configuration, lower inboard storage compartments 66a of right side cabinet 60, interior storage compartment 56 of central cabinet 50 and lower inboard storage compartments 86a of left side cabinet 80 together form a unified storage compartment 98 that extends between divider 70 of right side cabinet 60 and divider 90 of left side cabinet 80. In this unique arrangement, unified storage compartment 98 is larger than any of interior storage compartment 56, lower inboard storage compartment 66a or lower inboard storage compartment 86a enabling larger items to be securely stored therein during flight. Each of central cabinet 50, right side cabinet 60 and left side cabinet 80 are preferably secured to the floor of aircraft cabin 26. Additionally, central cabinet 50, right side cabinet 60 and left side cabinet 80 may be coupled together prior to or after installation within aircraft cabin 26.

The structural elements of pilot storage system 28 may be formed from strong and lightweight materials such as wood, metal, polymer composites or other suitable materials. The exterior of pilot storage system 28 may have an outer skin that matches other cabin elements and may be formed from wood veneer, leather, polymer or other suitably stylish material. Pilot storage system 28 may include one or more charging ports such as universal serial bus (USB) charging ports or other types charging ports suitable for the electronic devices commonly transported by pilots. Pilot storage system 28 may include, for example, LED lighting in the interior of one or more of the compartments and/or may have LED lighting on exterior surfaces thereof.

Figures 5A, 5B:
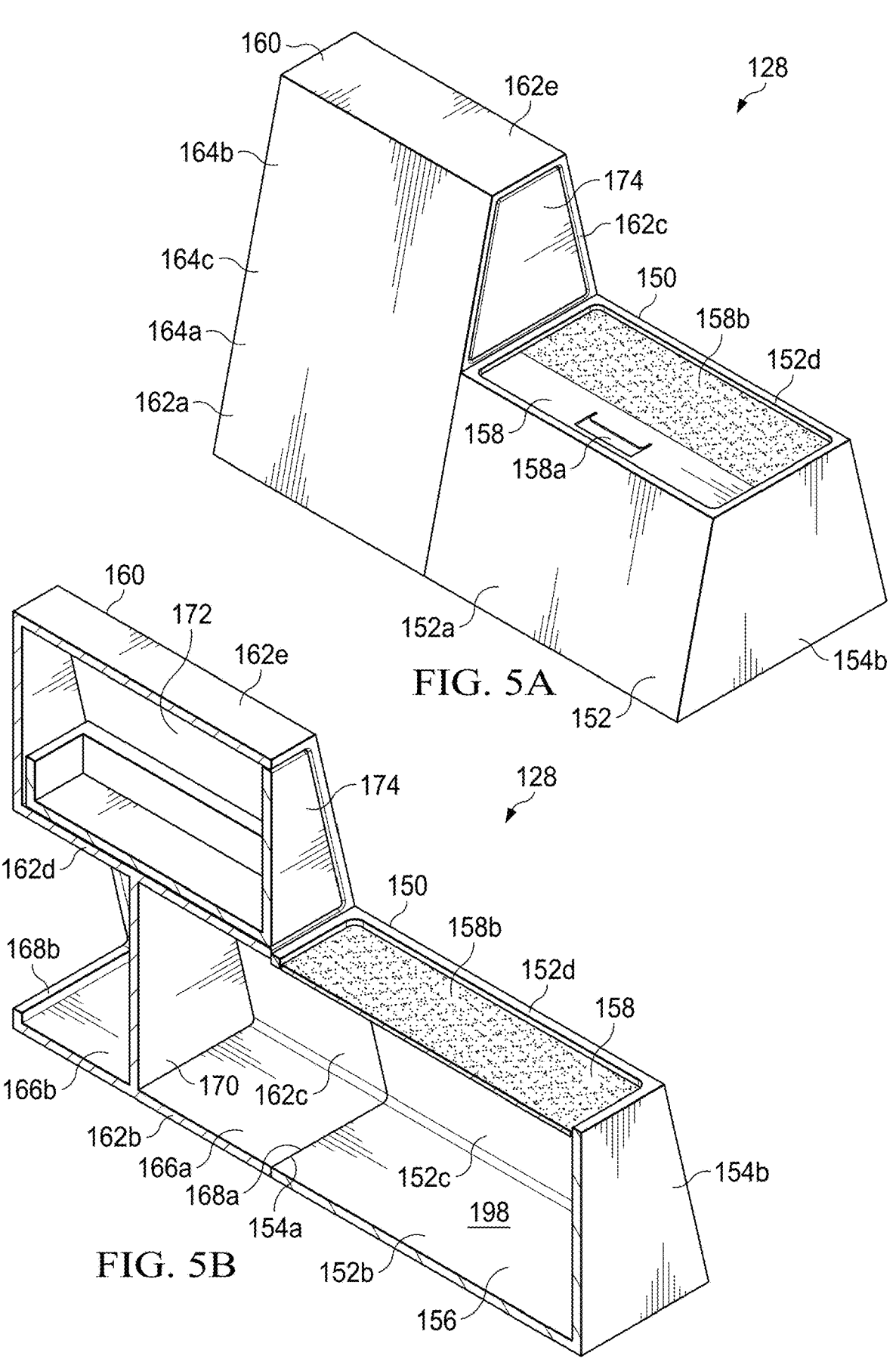
FIGS. 5A-5B are isometric and cross sectional views of an alternate pilot storage system in accordance with embodiments of the present disclosure.

Even though pilot storage system 28 has been depicted and described as having a central cabinet, a right side cabinet and a left side cabinet that are assembled together to form a unified storage compartment, it should be understood by those having ordinary skill in the art that a pilot storage system of the present disclosure could have alternative configurations with fewer than three cabinets without departing from the principles of the present disclosure. For example, as best seen in FIGS. 5A-5B, a pilot storage system 128 includes a central cabinet 150 having a forward wall 152a, a lower base 152b, an aft wall 152c and an upper frame 152d that are coupled together using screws, glue, hidden joints or other suitable fastening means to form a trapezoidal prism 152 having an open side 154a, a closed side 154b and defining an interior storage compartment 156. Central cabinet 150 has a lid 158 that is hingably coupled to upper frame 152d. Lid 158 includes a handle 158a that allows a user to open and closed lid 158 to selectively provide access to interior storage compartment 156 from the top of central cabinet 150. In the illustrated embodiment, a portion of the upper surface of lid 158 has a nonslip surface 158b. The depth of upper frame 152d defined as the distance between forward wall 152a and aft wall 152c at upper frame 152d is less than the depth of lower base 152b defined by the distance between forward wall 152a and aft wall 152c at lower base 152b. In this configuration, forward wall 152a has an aftward tilt which tends to match the aftward tilt of forward-facing cockpit seats 30a, 30b and aft wall 152c has a forward tilt which tends to match the forward tilt of aft-facing passenger seats 32a, 32b, 32c.

A right side cabinet 160 is positioned adjacent to open side 154a of central cabinet 150. Right side cabinet 160 has a forward wall 162a, a lower base 162b, an aft wall 162c, an intermediate panel 162d and a top panel 162e that are coupled together using screws, glue, hidden joints or other suitable fastening means. Together, a lower portion of forward wall 162a, lower base 162b, a lower portion of aft wall 162c and intermediate panel 162d form a lower trapezoidal prism 164a. Similarly, an upper portion of forward wall 162a, intermediate panel 162d, an upper portion of aft wall 162c and top panel 162e form an upper trapezoidal prism 164b. In addition, forward wall 162a, lower base 162b, aft wall 162c and top panel 162e form a trapezoidal prism 164c. The depth of top panel 162e defined as the distance between forward wall 162a and aft wall 162c at top panel 162e is less than the depth of intermediate panel 162d defined by the distance between forward wall 162a and aft wall 162c at intermediate panel 162d which is less than the depth of lower base 162b defined by the distance between forward wall 162a and aft wall 162c at lower base 162b. In this configuration, forward wall 162a has an aftward tilt which tends to match the aftward tilt of forward-facing cockpit seats 30a, 30b and aft wall 162c has a forward tilt which tends to match the forward tilt of aft-facing passenger seats 32a, 32b, 32c.

Lower trapezoidal prism 164a defines a lower inboard storage compartment 166a with an open inboard side 168a that may be accessed from the top of central cabinet 150 when lid 158 is open, as discussed herein. In addition, lower trapezoidal prism 164a defines a lower outboard storage compartment 166b with an open outboard side 168b that is accessed from an outboard side thereof via forward passenger door 36b when forward passenger door 36b is open. In the illustrated embodiment, a divider 170 separates lower inboard storage compartment 166a and lower outboard storage compartment 166b such that lower inboard storage compartment 166a is larger than lower outboard storage compartment 166b. Upper trapezoidal prism 164b defines an upper storage compartment 172. In the illustrated embodiment, a drawer 174 is coupled to upper storage compartment 172 with a telescoping slide mechanism (not visible) such that drawer 174 has open and closed positions to selectively provide access to upper storage compartment 172. Similar to drawer 74 of pilot storage system 28, when drawer 174 translates in the inboard direction from the closed position to the open position, drawer 174 is positioned at least partially above central cabinet 150.

In the fully assembled orientation, pilot storage system 128 includes right side cabinet 160 positioned adjacent to open side 154a of central cabinet 150 such that open side 168a of lower inboard storage compartments 166a is aligned with open side 154a of central cabinet 150. In this configuration, lower inboard storage compartments 166a of right side cabinet 160 and interior storage compartment 156 of central cabinet 150 together form a unified storage compartment 198 that extends between divider 170 of right side cabinet 160 and closed side 154b of central cabinet 150. In this unique arrangement, unified storage compartment 198 is larger than interior storage compartment 156 or lower inboard storage compartment 166a enabling larger items to be securely stored therein during flight. Each of central cabinet 150 and right side cabinet 160 is preferably secured to the floor of aircraft cabin 26. Additionally, central cabinet 150 and right side cabinet 160 may be coupled together prior to or after installation within aircraft cabin 26.

Figure 6A:
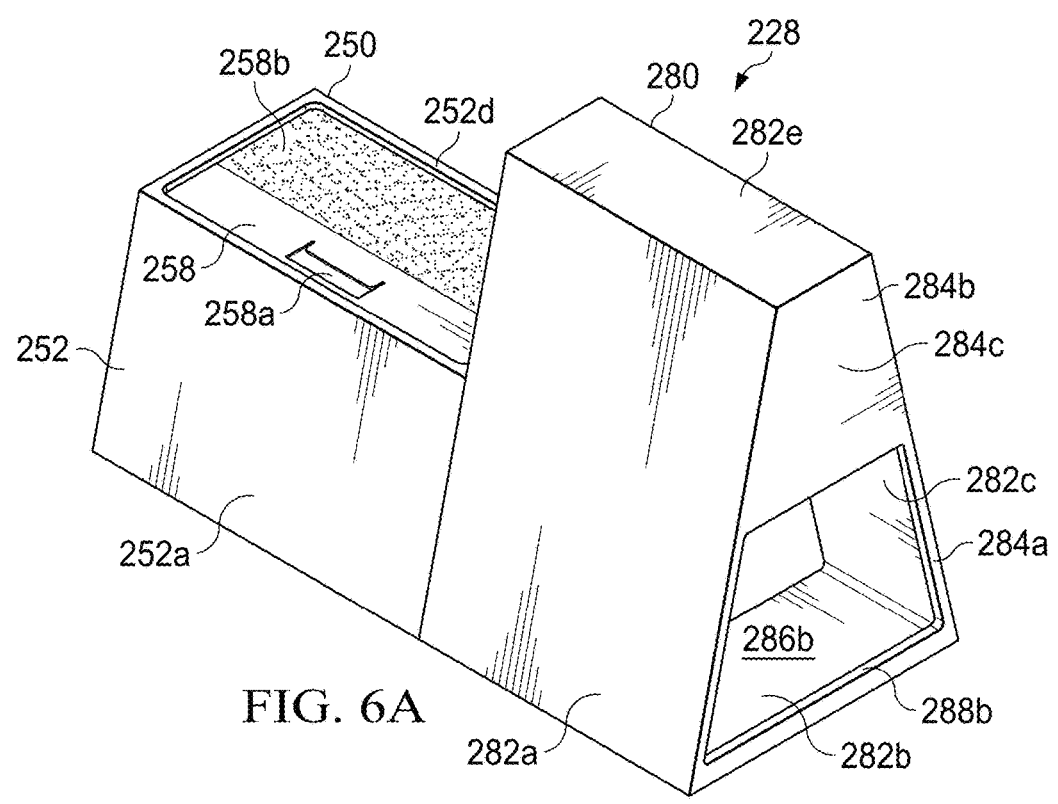
FIGS. 6A-6B are isometric and cross sectional views of an alternate pilot storage system in accordance with embodiments of the present disclosure.
Figure 6B:
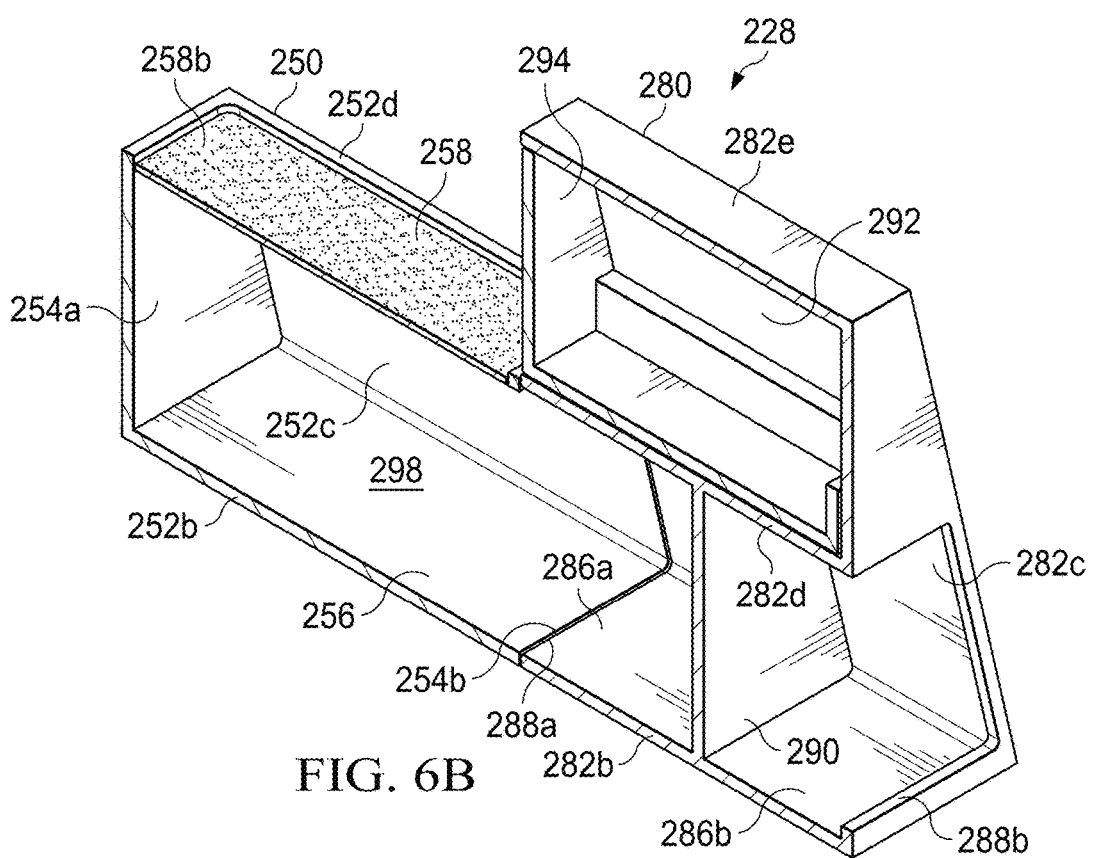

As another example, as best seen in FIGS. 6A-6B, a pilot storage system 228 includes a central cabinet 250 having a forward wall 252a, a lower base 252b, an aft wall 252c and an upper frame 252d that are coupled together using screws, glue, hidden joints or other suitable fastening means to form a trapezoidal prism 252 having a closed side 254a, an open side 254b and defining an interior storage compartment 256.

Central cabinet 250 has a lid 258 that is hingably coupled to upper frame 252d. Lid 258 includes a handle 258a that allows a user to open and closed lid 258 to selectively provide access to interior storage compartment 256 from the top of central cabinet 250. In the illustrated embodiment, a portion of the upper surface of lid 258 has a nonslip surface 258b. The depth of upper frame 252d defined as the distance between forward wall 252a and aft wall 252c at upper frame 252d is less than the depth of lower base 252b defined by the distance between forward wall 252a and aft wall 252c at lower base 252b. In this configuration, forward wall 252a has an aftward tilt which tends to match the aftward tilt of forward-facing cockpit seats 30a, 30b and aft wall 252c has a forward tilt which tends to match the forward tilt of aft-facing passenger seats 32a, 32b, 32c.

A left side cabinet 280 is positioned adjacent to open side 254b of central cabinet 250. Left side cabinet 280 has a forward wall 282a, a lower base 282b, an aft wall 282c, an intermediate panel 282d and a top panel 282e that are coupled together using screws, glue, hidden joints or other suitable fastening means. Together, a lower portion of forward wall 282a, lower base 282b, a lower portion of aft wall 282c and intermediate panel 282d form a lower trapezoidal prism 284a. Similarly, an upper portion of forward wall 282a, intermediate panel 282d, an upper portion of aft wall 282c and top panel 282e form an upper trapezoidal prism 284b. In addition, forward wall 282a, lower base 282b, aft wall 282c and top panel 282e form a trapezoidal prism 284c. The depth of top panel 282e defined as the distance between forward wall 282a and aft wall 282c at top panel 282e is less than the depth of intermediate panel 282d defined by the distance between forward wall 282a and aft wall 282c at intermediate panel 282d which is less than the depth of lower base 282b defined by the distance between forward wall 282a and aft wall 282c at lower base 282b. In this configuration, forward wall 282a has an aftward tilt which tends to match the aftward tilt of forward-facing cockpit seats 30a, 30b and aft wall 282c has a forward tilt which tends to match the forward tilt of aft-facing passenger seats 32a, 32b, 32c.

Lower trapezoidal prism 284a defines a lower inboard storage compartment 286a with an open inboard side 288a that may be accessed from the top of central cabinet 250 when lid 258 is open, as discussed herein. In addition, lower trapezoidal prism 284a defines a lower outboard storage compartment 286b with an open outboard side 288b that is accessed from an outboard side thereof via forward passenger door 36b when forward passenger door 36b is open. In the illustrated embodiment, a divider 290 separates lower inboard storage compartment 286a and lower outboard storage compartment 286b such that lower inboard storage compartment 286a is larger than lower outboard storage compartment 286b. Upper trapezoidal prism 284b defines an upper storage compartment 292. In the illustrated embodiment, a drawer 294 is coupled to upper storage compartment 292 with a telescoping slide mechanism (not visible) such that drawer 294 has open and closed positions to selectively provide access to upper storage compartment 292. Similar to drawer 94 of pilot storage system 28, when drawer 294 translates in the inboard direction from the closed position to the open position, drawer 294 is positioned at least partially above central cabinet 250.

In the fully assembled orientation, pilot storage system 228 includes right side cabinet 280 positioned adjacent to open side 254b of central cabinet 250 such that open side 288a of lower inboard storage compartments 286a is aligned with open side 254b of central cabinet 250. In this configuration, lower inboard storage compartments 286a of right side cabinet 280 and interior storage compartment 256 of central cabinet 250 together form a unified storage compartment 298 that extends between divider 290 of right side cabinet 280 and closed side 254a of central cabinet 250. In this unique arrangement, unified storage compartment 298 is larger than interior storage compartment 256 or lower inboard storage compartment 268a enabling larger items to be securely stored therein during flight. Each of central cabinet 250 and right side cabinet 280 is preferably secured to the floor of aircraft cabin 26. Additionally, central cabinet 250 and right side cabinet 280 may be coupled together prior to or after installation within aircraft cabin 26.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. For example, numerous combinations of the features disclosed herein will be apparent to persons skilled in the art including the combining of features described in different and diverse embodiments, implementations, contexts, applications and/or figures. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A pilot storage system positionable between forward-facing cockpit seats and aft-facing passenger seats in an aircraft cabin, the pilot storage system comprising:
    a central cabinet having first and second open sides and an interior storage compartment;
    a first side cabinet positioned adjacent to the first open side of the central cabinet, the first side cabinet having a first upper storage compartment, a first lower inboard storage compartment with an open side and a first lower outboard storage compartment separated from the first lower inboard storage compartment by a first divider; and
    a second side cabinet positioned adjacent to the second open side of the central cabinet, the second side cabinet having a second upper storage compartment, a second lower inboard storage compartment with an open side and a second lower outboard storage compartment separated from the second lower inboard storage compartment by a second divider;
    wherein the open sides of the first and second lower inboard storage compartments are respectively aligned with the first and second open sides of the central cabinet such that the first and second lower inboard storage compartments and the interior storage compartment form a unified storage compartment that is accessible from the central cabinet; and
    wherein the central cabinet includes a lid hingably coupled to an upper frame of the central cabinet, the lid being movable between a closed position and an open position to selectively provide access to the unified storage compartment from a top of the central cabinet.

2. The pilot storage system as recited in claim 1, wherein the lid includes an upper surface having at least a portion that is nonslip.

3. The pilot storage system as recited in claim 1, wherein the central cabinet has a forward wall, a lower base, an aft wall and the upper frame that are coupled together to form a trapezoidal prism having the first and second open sides; and wherein the upper frame has a depth that is less than a depth of the lower base such that the forward wall has an aftward tilt and the aft wall has a forward tilt.

4. The pilot storage system as recited in claim 1, wherein the first side cabinet has a forward wall, a lower base, an aft wall, an intermediate panel and a top panel that are coupled together such that the forward wall, the lower base, the aft wall and the intermediate panel form a lower trapezoidal prism including the first lower inboard storage compartment with the open side and the first lower outboard storage compartment and such that the forward wall, the intermediate panel, the aft wall and the top panel form an upper trapezoidal prism including the first upper storage compartment.

5. The pilot storage system as recited in claim 4, wherein the top panel has a depth that is less than a depth of the intermediate panel and the depth of the intermediate panel is less than a depth of the lower base such that the forward wall has an aftward tilt and the aft wall has a forward tilt.

6. The pilot storage system as recited in claim 1, further comprising a first drawer slidably coupled to the first upper storage compartment, the first drawer having open and closed positions to selectively provide access to the first upper storage compartment.

7. The pilot storage system as recited in claim 6, further comprising a first telescoping slide mechanism that slidably couples the first drawer to the first upper storage compartment.

8. The pilot storage system as recited in claim 6, wherein the first drawer translates in the inboard direction from the closed position to the open position such that in the open position, the first drawer is positioned at least partially above the central cabinet.

9. The pilot storage system as recited in claim 1, wherein the first lower inboard storage compartment is larger than the first lower outboard storage compartment.

10. The pilot storage system as recited in claim 1, wherein the first lower outboard storage compartment is accessed from an outboard side thereof.

11. The pilot storage system as recited in claim 1, wherein the second side cabinet has a forward wall, a lower base, an aft wall, an intermediate panel and a top panel that are coupled together such that the forward wall, the lower base, the aft wall and the intermediate panel form a lower trapezoidal prism including the second lower inboard storage compartment with the open side and the second lower outboard storage compartment and such that the forward wall, the intermediate panel, the aft wall and the top panel form an upper trapezoidal prism including the second upper storage compartment.

12. The pilot storage system as recited in claim 11, wherein the top panel has a depth that is less than a depth of the intermediate panel and the depth of the intermediate panel is less than a depth of the lower base such that the forward wall has an aftward tilt and the aft wall has a forward tilt.

13. The pilot storage system as recited in claim 1, further comprising a second drawer slidably coupled to the second upper storage compartment, the second drawer having open and closed positions to selectively provide access to the second upper storage compartment.

14. The pilot storage system as recited in claim 13, further comprising a second telescoping slide mechanism that slidably couples the second drawer to the second upper storage compartment.

15. The pilot storage system as recited in claim 13, wherein the second drawer translates in the inboard direction from the closed position to the open position such that in the open position, the second drawer is positioned at least partially above the central cabinet.

16. The pilot storage system as recited in claim 1, wherein the second lower inboard storage compartment is larger than the second outboard storage compartment.

17. The pilot storage system as recited in claim 1, wherein the second outboard storage compartment is accessed from an outboard side thereof.

18. An aircraft cabin comprising:

a row of forward-facing cockpit seats;

a row of aft-facing passenger seats; and a pilot storage system positioned between the row of forward-facing cockpit seats and the row of aft-facing passenger seats, the pilot storage system comprising:

a central cabinet having first and second open sides and an interior storage compartment;

a first side cabinet positioned adjacent to the first open side of the central cabinet, the first side cabinet having a first upper storage compartment, a first lower inboard storage compartment with an open side and a first lower outboard storage compartment separated from the first lower inboard storage compartment by a first divider; and a second side cabinet positioned adjacent to the second open side of the central cabinet, the second side cabinet having a second upper storage compartment, a second lower inboard storage compartment with an open side and a second lower outboard storage compartment separated from the second lower inboard storage compartment by a second divider;

wherein the open sides of the first and second lower inboard storage compartments are respectively aligned with the first and second open sides of the central cabinet such that the first and second lower inboard storage compartments and the interior storage compartment form a unified storage compartment that is accessible from the central cabinet; and wherein the central cabinet includes a lid hingably coupled to an upper frame of the central cabinet, the lid being movable between a closed position and an open position to selectively provide access to the unified storage compartment from a top of the central cabinet.

19. An aircraft comprising:

a fuselage;

an aircraft cabin positioned within the fuselage;

a row of forward-facing cockpit seats positioned in the aircraft cabin;

a row of aft-facing passenger seats positioned in the aircraft cabin; and a pilot storage system positioned between the row of forward-facing cockpit seats and the row of aft-facing passenger seats, the pilot storage system comprising:

a central cabinet having first and second open sides and an interior storage compartment;

a first side cabinet positioned adjacent to the first open side of the central cabinet, the first side cabinet having a first upper storage compartment, a first lower inboard storage compartment with an open side and a first lower outboard storage compartment separated from the first lower inboard storage compartment by a first divider; and a second side cabinet positioned adjacent to the second open side of the central cabinet, the second side cabinet having a second upper storage compartment, a second lower inboard storage compartment with an open side and a second lower outboard storage compartment separated from the second lower inboard storage compartment by a second divider;

wherein the open sides of the first and second lower inboard storage compartments are respectively aligned with the first and second open sides of the central cabinet such that the first and second lower inboard storage compartments and the interior storage compartment form a unified storage compartment that is accessible from the central cabinet; and wherein the central cabinet includes a lid hingably coupled to an upper frame of the central cabinet, the lid being movable between a closed position and an open position to selectively provide access to the unified storage compartment from a top of the central cabinet.

* * * * *